United States Patent [19]
Anderson et al.

[11] Patent Number: 5,838,924
[45] Date of Patent: Nov. 17, 1998

[54] ASYNCHRONOUS TRANSFER MODE (ATM) CONNECTION PROTECTION SWITCHING APPARATUS AND METHOD

[75] Inventors: Jon Anderson, Brielle, N.J.; Curtis J. Newton, Medford, Mass.; Tai H. Noh, Manalapan, N.J.

[73] Assignee: Lucent Technologies Inc, Murray Hill, N.J.

[21] Appl. No.: 689,175

[22] Filed: Aug. 6, 1996

[51] Int. Cl.⁶ .................................................. H01J 13/00
[52] U.S. Cl. .................... 395/200.69; 370/352; 370/355
[58] Field of Search ...................... 395/200.53, 200.54, 395/200.55, 200.56, 200.59, 200.65, 200.68, 200.69, 200.7; 370/352, 355

[56] References Cited

U.S. PATENT DOCUMENTS 5,467,348  11/1995  Fujii et al. ........................... 370/468

OTHER PUBLICATIONS

"An ATM VP–Based Self–Healing Ring" by Yoshio Kajiyama, et al., in the IEEE Journal on Selected Areas in Communications, vol. 12, No. 1, Jan. 1994, pp. 171–178.

"Restoration Message Transfer Mechanism and Restoration Characteristics of Double–Search Self–Healing ATM Network" by Hiroyuki Fujii and Noriaki Yoshikai, in the IEEE Journal on Selected Areas in Communications, vol. 12, No. 1, Jan. 1994, pp. 149–158.

"Reconfiguration for Service and Self–Healing in ATM Networks Based on Virtual Paths" by Tai H. Noh, et al., pp. 525–530.

*Primary Examiner*—Frank J. Asta
*Assistant Examiner*—Daniel Patru

[57] ABSTRACT

A Virtual Path Group (VPG) technique that utilizes network elements (NEs), i.e., nodes, that are visible to ATM specific defects, and allows for fast ATM virtual connection/ restoration with a minimum of processing. This is realized by employing a Virtual Path Group transport architecture comprises at least one (1) working route, one (1) protection route, and VPG bridge and selector functions at each end of the routes. It is applicable to 1+1, mesh and ring protection switching and is extensible to any virtual connection segment or end-to-end network (cross-subnetwork) virtual connections, and extensible to 1:1 and M:N protection switching. Additionally, the protection switching arrangement of the invention includes an architecture for the Virtual Path Group (VPG) concept in which the associations among individual ATM virtual channels (VP/VCs) and VPGs are maintained entirely within the network element management function. This allows VPG support to be added to ATM systems and networks with minimum change from current ATM standards. In particular, no changes are required to the Virtual Path Identifier/Virtual Channel Identifier (VPI/VCI) addresses carried within each ATM cell across ATM interfaces. Further, defect type indication is realized via a new, for example a F4, segment level Operation and Maintenance (OAM) cell, to initiate the appropriate restoration action downstream. The technique differentiates between physical layer and ATM layer defects. An algorithm is employed in an embodiment of the invention to determine appropriate VPG protection switch and signaling actions, driven by the F4 defect type OAM cells. Moreover, for interworking with physical layer protection (e.g. SONET Bi-Directional Line Switched Ring (BLSR)), a VPG protection holdoff function is employed at the VPG protection selector. A technical advantage of this protection switching invention is that it provides extremely fast protection switching of an extremely large number of ATM virtual connections.

37 Claims, 9 Drawing Sheets

ASYNCHRONOUS TRANSFER MODE (ATM) CONNECTION PROTECTION SWITCHING APPARATUS AND METHOD

TECHNICAL FIELD

This invention relates to protection switching and, more particularly, to protection switching in asynchronous transfer mode (ATM) switching arrangements.

BACKGROUND OF THE INVENTION

Telecommunications networks frequently have the ability to reconfigure or adapt in the event of various service-affecting defects, so as to restore the network's service capabilities. For instance, in SONET-based optical networks, various restoration techniques have been devised and deployed, i.e., protection switching, ring topologies, self-healing and rerouting networks. In many applications, restoration must be extremely fast (60–200 msec), which can place extreme and costly processing demands on network elements.

New networks are being developed based on Asynchronous Transfer Mode (ATM), often carried within a physical layer such as SONET. For these ATM networks, the existing physical layer (e.g., SONET line or path) protection switching and restoration capabilities may not provide sufficient coverage for ATM-specific defects, which are not visible to the physical layer detection mechanisms. Consequently, new protection switching techniques with visibility to ATM defects are needed.

Protection switching of individual ATM virtual channels (Virtual Path (VP) or Virtual Connection (VC)) could restore these ATM-specific defects. However, an ATM network element (NE), i.e., node, may have to process hundreds or thousands of separate virtual channels. A large-scale defect such as a facility or node failure will cause a defect on each virtual channel, leading to hundreds or thousands of separate detection, processing, and protection operations. Thus; with per-virtual channel protection switching, it may be prohibitive to satisfy the requirements for fast restoration within the NE's cost and processing constraints.

SUMMARY OF THE INVENTION

Problems and limitations of prior protection switching arrangements for asynchronous transfer mode (ATM) arrangements are overcome by employing a Virtual Path Group (VPG) technique that utilizes network elements (NEs), i.e., nodes, that are visible to ATM specific defects, and allows for fast ATM virtual connection/restoration with a minimum of processing.

This is realized by employing a Virtual Path Group transport architecture comprising at least one (1) working route, one (1) protection route, and VPG bridge and selector functions at each end of the routes. It is applicable to 1+1, mesh and ring protection switching and is extensible to any virtual connection segment or end-to-end network (cross-subnetwork) virtual connections, and extensible to 1:1 and M:N protection switching.

Additionally, the protection switching arrangement of the invention includes an architecture for the Virtual Path Group (VPG) concept in which the associations among individual ATM virtual channels (VPVCs) and VPGs are maintained entirely within the network element management function. This allows VPG support to be added to ATM systems and networks with minimum change from current ATM standards. In particular, no changes are required to the Virtual Path Identifier/Virtual Channel Identifier (VPI/VCI) addresses carried within each ATM cell across ATM interfaces.

Further, defect type indication is realized via a new, for example a F4, segment level Operation and Maintenance (OAM) cell, to initiate the appropriate restoration action downstream. The technique differentiates between physical layer and ATM layer defects.

An algorithm is employed in an embodiment of the invention to determine appropriate VPG protection switch and signaling actions, driven by the F4 defect type OAM cells. Moreover, for interworking with physical layer protection (e.g. SONET Bi-Directional Line Switched Ring (BLSR)), a VPG protection holdoff function is employed at the VPG protection selector.

A technical advantage of this protection switching invention is that it provides extremely fast protection switching of an extremely large number of ATM virtual connections.

DETAILED DESCRIPTION

At the outset it is felt best to define certain terms and definitions that will be employed in describing an embodiment of the invention as follows:

Virtual Path Group (VPG): A logical group of one or more ATM Virtual Path (VP) connections or connection segments with common source node, intermediate nodes and sink node transmission path level addresses. It is an option to have a common QoS for all VP connections or connection segments in the VPG. The VPG is always provisioned as a working and protection VPG pair. Additionally, it should be noted that a VPG may not include any intermediate nodes or may include a plurality of intermediate nodes.

Working VPG (VPG_w): A VPG comprised of working ATM VP connections or connection segments that bear user traffic in normal, operating conditions.

Protection VPG (VPG_p): An alternate, physically diverse, VPG comprised of dedicated protection VP connections or connection segments assigned to a working VPG.

Transmission Path (TP): The physical route traversing ATM nodes between VP connection or connection segment end points (i.e., source and sink nodes).

Defect Type Indications (DTI):

0: physical layer defects; defects that result from physical layer defects/failures, up to and including TP adaptation (e.g., Loss of Signal (LOS), Loss of Frame (LOF), Loss of Pointer (LOP), Loss of Cell Delineation (LCD).

1: ATM layer defects; Loss of Continuity, (LOC) virtual connection signal degradation.

Defect Indication Mechanism:

F4 level OAM cells to indicate the detected defect type for each affected ATM VP connection or connection segment.

Figure 1:
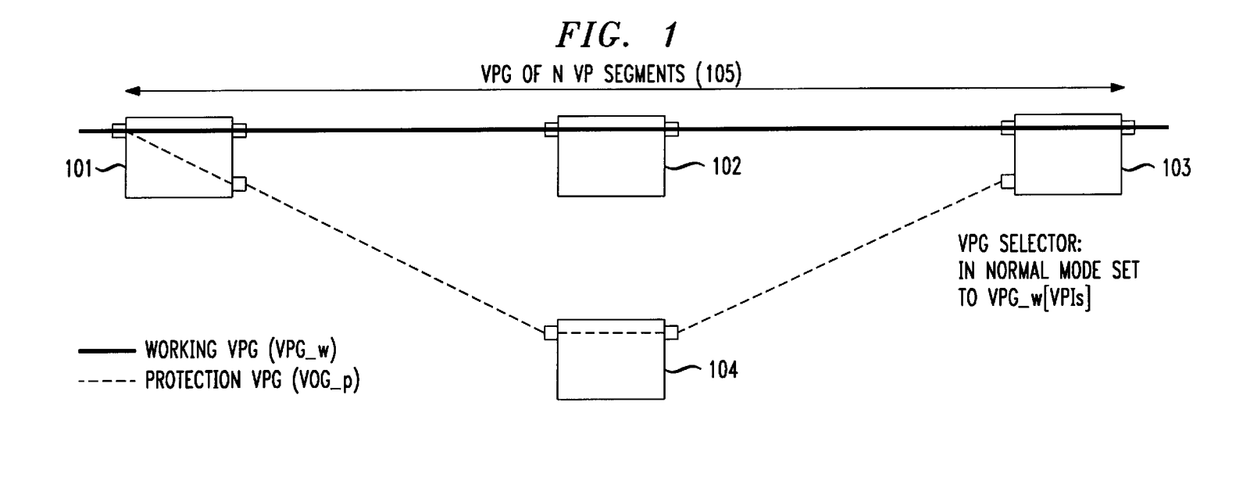
FIG. 1 shows, in simplified block diagram form, a point-to-point ATM arrangement in a normal operational mode, employing an embodiment of the invention.

FIG. 1 shows, in simplified block diagram form, an arrangement of nodes, i.e., network elements, in a point-to-point ATM transmission arrangement for virtual path group 1+1 protection switching that is operating in a normal node, i.e., with no fault detected. Although only a 1+1 protection switch architecture is being described, it will be apparent to those skilled in the art that an M:N protection switching arrangement could also employ the invention. Additionally, the invention can also be employed in a so-called ring or mesh configuration of nodes. For brevity and clarity of exposition, it will be assumed that a left to right direction of flow of the communications traffic is being employed. However, as it will be apparent to those skilled in the art, communications traffic can and does also flow in a right to left direction. Thus, node 101 is considered a source node, node 102 is considered an intermediate node and node 103 is considered a sink, i.e., destination, node. Again, as indicated above, in certain configurations there may not be any intermediate nodes. Furthermore, other configurations may include a plurality of intermediate nodes. The solid line connecting nodes 101, 102 and 103 is the normal working virtual path group (VPG), while the dotted outlined path is the protection virtual path group (PVPG) and node 104 is an intermediate node in the protection path. It is noted that the communications traffic is supplied from node 101 to both the working VPG path and the PVPG path.

The VPG 1+1 protection switching architecture in the normal operation mode is illustrated in FIG. 1. This architecture is comprised of a VPG Source node 101, a VPG Sink node 103 and an arbitrary number of VPG intermediate nodes 102 supporting the VPG. A set of N VP connection segments (105) are logically assigned to a working VPG and a protection VPG. As discussed previously, the VPG working and protection VPG assignments are handled by a sub-network management system. These assignments are specifically performed at the VPG Source and Sink nodes, 101 and 103, respectively. Intermediate nodes, i.e., 102 and 104, supporting the working VPG and the protection VPG, respectively, are not required to have knowledge of the VP connection segment logical assignment. Only proper VPI translation is required at intermediate nodes 102 and 104. In the 1+1 protection switching architecture, the route and bandwidth of the protection VPG is preallocated by the sub-network management system.

At the VPG Source node 101, the VP connection segments logically assigned to the VPG are 1:2 multicast onto the working VPG and the protection VPG. That is, the source signals on the working channel are copied identically onto the protection channel, which is characteristically done in 1+1 protection switching architectures. At the VPG Sink node 103, a VPG 2:1 selector is implemented to select the ingress connection traffic from the working VPG or the protection VPG. In the normal operation mode, the VPG selector is set to select the working VPG.

Details of the individual nodes 101–104 are described below.

Figure 2:
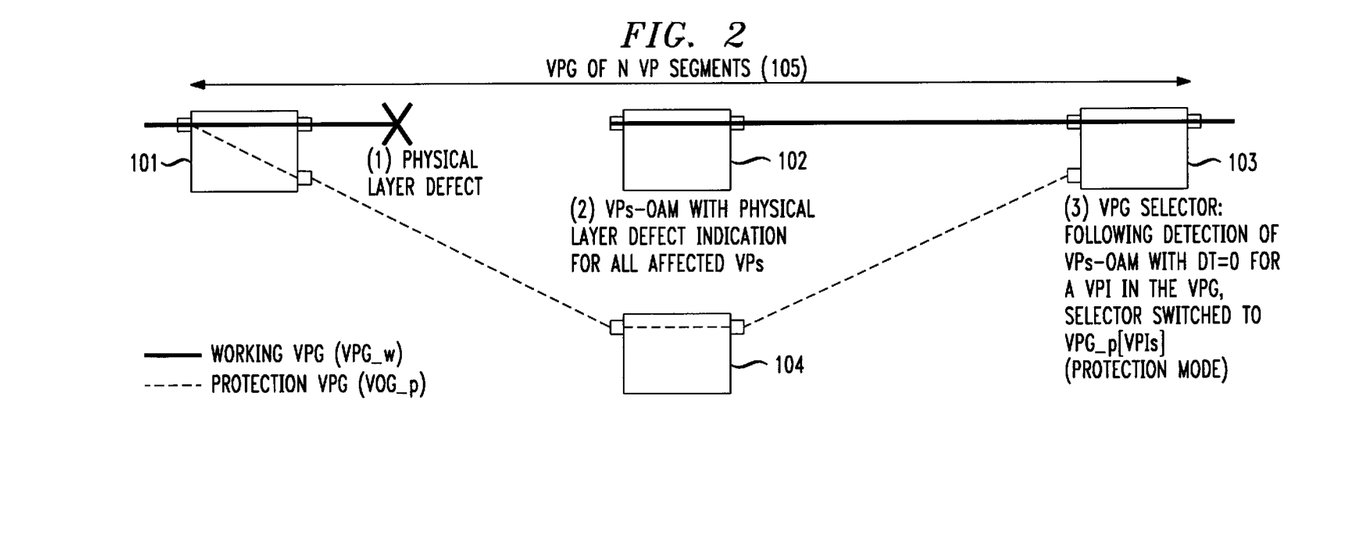
FIG. 2 shows, in simplified block diagram form, a point-to-point ATM node arrangement illustrating a fault condition and also employing an embodiment of the invention.

FIG. 2 shows, in simplified block diagram form, a point-to-point ATM node arrangement illustrating a fault condition. For purposes of illustration, a physical layer defect is shown to have occurred between nodes 101 and 102. The VPG 1+1 protection switching architecture in the protection mode is illustrated in FIG. 2. The detailed functions of the VPG nodes 101, 102, 103, and 104 are described below. An overview of the VPG 1+1 protection switching actions is given as follows:

1) A Physical Layer defect condition is detected at a VPG Intermediate node 102 or Sink node 103, due to a fiber cut, a degraded transmitter, etc. The Physical Layer defect (Server Layer) causes connection and service disruption in the ATM Layer (Client Layer). No assumptions are made regarding the persistence of the Physical Layer defect or any enabled Physical Layer protection switching capabilities (e.g. SONET Automatic Protection Switching).

2) The Physical Layer defect is detected at the first downstream node, for example intermediate node 102, Transmission Path/ATM adaptation function via Loss of Cell Delineation (LCD). VP segment level Alarm Indication Signal (VPseg-AIS) OAM cells are generated for all affected VPIs at intermediate node 102 adaptation function. The first OAM cell for all affected VPIs is inserted in the egress cell stream within 10 milliseconds following the declaration of the LCD defect. The Detect Type Indicator in the VPseg-AIS OAM cell is set to "0", to indicate the presence of a "Server Layer Defect". Generation of the end-to-end VP-AIS OAM cells within the 0.5 second time period, as required by ITU-T Telecommunications Standardization Sector of ITU I.610, is suppressed for all affected VPIs contained in the segment.

3) At the VPG Sink node 103, reception of VPseg-AIS is continuously monitored. Upon confirmed reception of VPs-AIS with the VPI associated with the particular VPG, the Defect Type Indication (DTI) value encoded in the AIS OAM cell is checked. If DTI=0, then a physical layer-related protection switch first hold-off timer is started. This first timer allows a delay or suppression of the VPG protection switching within a pre-specified hold-off time because the Physical Layer defect may be cleared by an enabled Physical Layer protection capability. If DTI ≠0, then an ATM layer-related protection switch second hold-off timer is started. This second timer may be set to zero (0) to enable fast ATM protection switching. Following expiration of the second timer, either Physical Layer-related or ATM Layer-related, and confirmation that the Physical Layer defect has not cleared, and that the VPG for which the VPI belongs is available (i.e. not indicating any VP-AIS or LOC), the VPG selector is switched to the protection VPG. Complete selection of the working VPG logically associated VPIs to the protection VPG VPIs is carried out in less than 50 milliseconds.

4) Following the VPG protection switch completion at the VPG destination node 103, the VPseg-AIS OAM cells received on the working VPG are monitored to declare when the working VPG defect state is cleared for a revertive protection switch (i.e. set the VPG selector back to the working VPG from the protection VPG). The reversion protection switch may be automatically or manually initiated.

5) A continuous check for VP Loss of Continuity (LOC) at the VPG Sink node 103 is also made. The VP Continuity Check function is implemented according to the above noted I.610 standard. This function allows for the detection of ATM layer-specific defects (e.g. VPI translation errors, ATM node failures) not visible at the Physical Layer. If LOC is detected at the destination VPG node 103, the VPG protection switching procedure follows as indicated above where the DTI≠0.

As indicated above, the invention is equally applicable to M:N protection switching. To this end, the VPG 1+1 protection switching architecture described above is extendible to other protection switching architectures in which the protection channel bandwidth is not reserved and may be shared by several working connections. In this M:N protection switching architecture, M protection connections serve N working connections. The VPG protection switching capability applies to the M:N arrangement, by changing protection switch in the protection switching technique with request for a protection switch, as selection from the working to the protection VPG is coordinated at both the source and the sink nodes.

Figure 3:
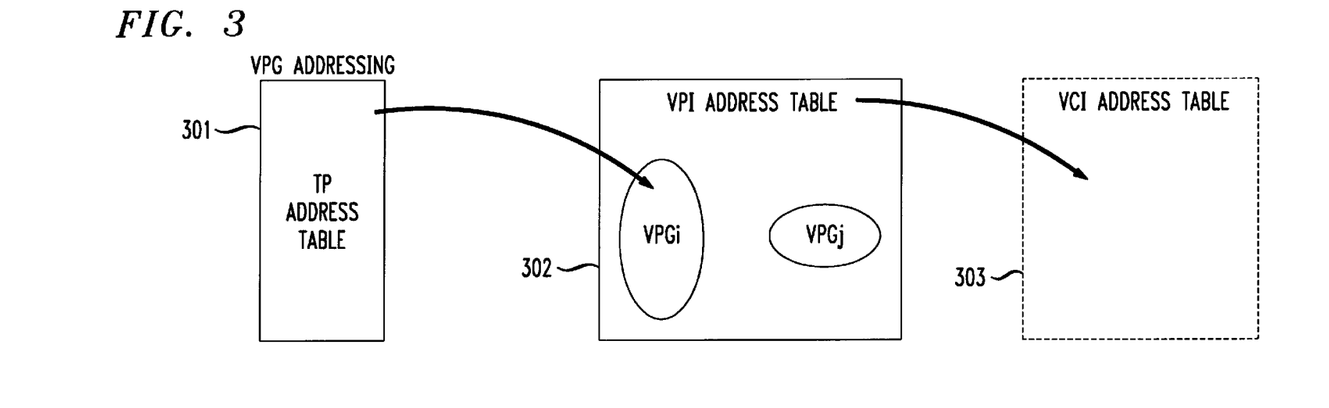
FIG. 3 illustrates, in simplified form, a virtual path group logical addressing relationship to transmission path, virtual path identifier and virtual channel identifier addresses which is useful in describing the operation of the invention.
Figure 6:
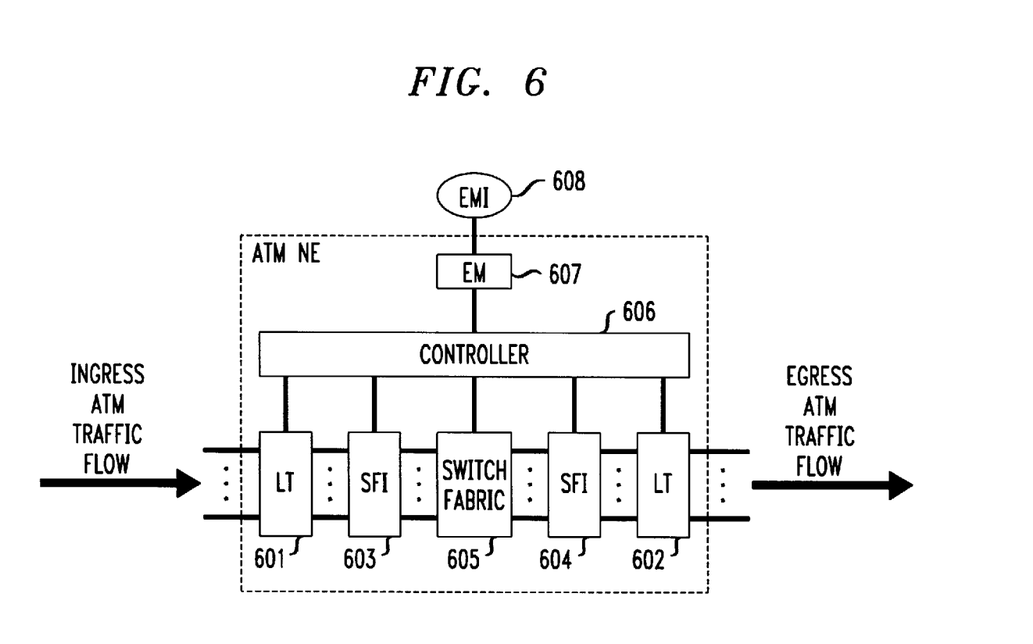
FIG. 6 shows, in simplified block diagram form, a generic ATM node functional architecture.

Before describing the details of a generic node as shown in FIG. 6, it is felt best to describe the VPG addressing technique employed in an embodiment of the invention, as shown in FIG. 3. The VPG__w and VPG__P are assigned at source node 101 and sink node 103 by a sub-network management system for a given set of one or more VP connections. The VPG may also be a set of VP connection segments, but it may not include VP connections and connection segments simultaneously. The set of VP connections or connection segments have common source and sink nodes and route between source and sink nodes 101 and 103, respectively. VPGs are not explicitly indicated in the ATM cell header, but instead, are logically associated with the VPI address tables that are maintained at source node 101 and sink node 103 via the network element (NE) controller (described below). Intermediate nodes 102 and 104 supporting the VP connections or connection segments are configured by a sub-network management system for providing VP working and protection connection routing, respectively, and OAM processing. Intermediate nodes do not need to have knowledge of the VPGs logical addressing. The VPG logical relationship to the TP address table 301, VPI address table 302 and VCI address table 303 is illustrated in FIG. 3.

Figure 4:
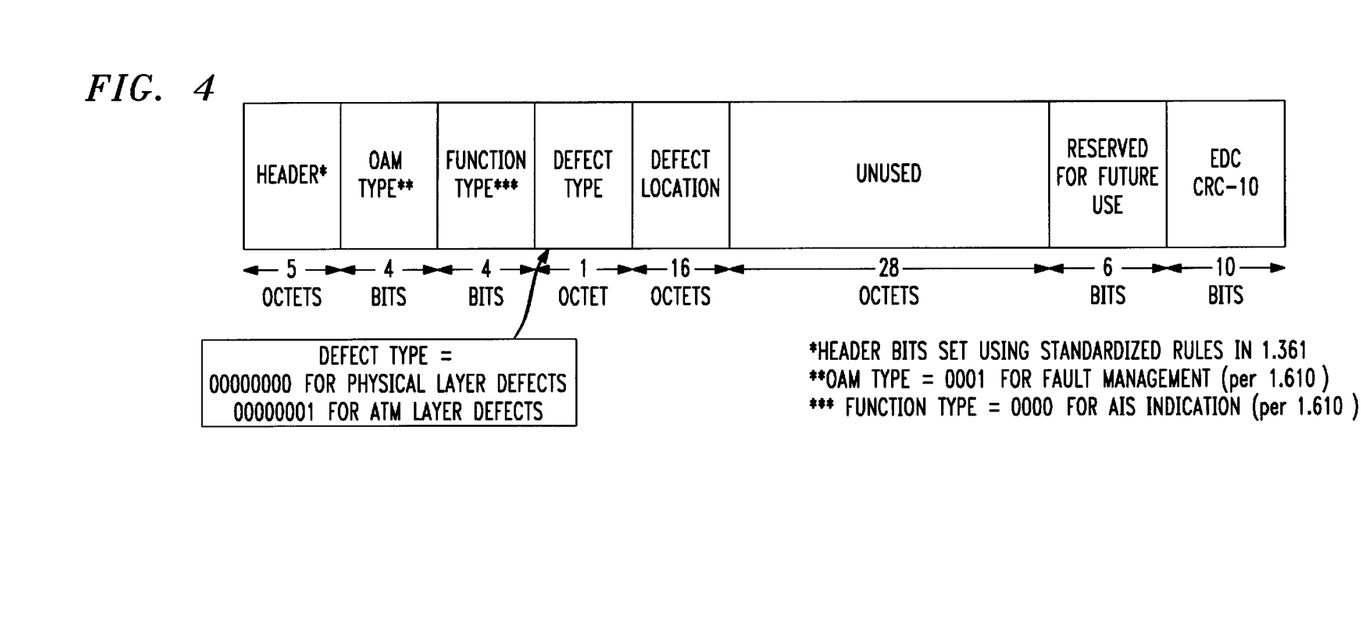
FIG. 4 illustrates a format of an ATM Operations and Maintenance (OAM) fault management cell including a defect type indicator which is also useful in describing the operation of the invention.

FIG. 4 illustrates a format of an ATM Operations and Maintenance (OAM) fault management cell including a defect type indicator which is also useful in describing the operation of the invention. The overall operation of the VPG protection switching method is described in terms of the following functions: defect detection, notification, and protection switching. The VPG protection switching method may be applied to VP connection and VP connection segment levels. In the VPG method, two detection criteria of the defects are used in the ATM transmission networks: physical layer (server layer) defects and ATM layer (client layer) defects. The VP Alarm Indication Signal OAM cells (VP-AIS), as defined In ITU-T Recommendation I.610, noted above, are used to indicate defective VP connections. In the VPG protection switching method, the VP-AIS function is used at the VP connection level for initiating VPG protection switching. For the physical layer defect detection criteria, VP-AIS cells are generated within 10 milliseconds following detection of the physical layer defect and sent downstream on all affected active VP connections from the VP connecting point node (e.g., ATM-XC/ADM) which detects the defect. The VP-AIS is then detected at the VP connection endpoint node, where VPG protection switching is then initiated. Upon receiving the VP-AIS at the VP connection endpoint node, a hold-off timer may be enabled to delay VPG protection switching actions. Another option is a VP-AIS reception counter may be enabled to confirm the persistence of the VP-AIS before initiating VPG protection switching.

For VPG protection switching at the VP connection segment level, a VP connection segment AIS is not defined in standards, but similar end-to-end VP-AIS operations principles are applied to define a VP connection segment level indication (VPseg-AIS) for initiating VPG protection switching. For the physical layer defect detection criteria, VPseg-AIS cells are generated within 10 milliseconds following detection of the physical layer defect and sent downstream on all affected active VP connection segments from the VP connecting point node(contained within the VP segment) which detects the defect. The VPseg-AIS is then detected at the VP connection segment endpoint node, where VPG protection switching is then initiated. Upon receiving the VPseg-AIS at the VP connection segment endpoint node, a hold-off timer or VPseg-AIS reception counter may be enabled.

In the case where VPG protection switching is being performed at the VP connection level and where the VP connecting point node detecting the physical layer defect is contained within a defined segment of this VP connection, the VP-AIS generation is suppressed and VPseg-AIS (described above) is generated within 10 milliseconds and sent downstream on all affected active VP segments. At the VP connection segment end point, the VPseg-AIS is escalated to VP-AIS for the given VPI. The VP-AIS is then sent downstream to the VP connection endpoint node, where VPG protection switching is then initiated. A hold-off timer may be desired in this case to allow for any VP protection switching enabled at the VP segment level to be performed. For the ATM layer defect detection criteria, indications are generated within 10 milliseconds following detection of the VP Loss of Continuity or degraded VP connection performance at the sink node for each affected VP connection or connection segment and sent to the sink node controller. In the case where VPG protection switching is being performed at the VP connection level and where an ATM layer defect is detected at a segment end-point contained within the VP connection, VP-AIS generation is generated within 10 milliseconds at the VP segment end-point for the all affected VP segments. The VP-AIS is then sent downstream to the VP connection endpoint nodes, where VPG protection switching is then initiated. A hold-off timer may be desired again in this case to allow for any VPG protection switching enabled at the VP segment level to perform. To recognize the VP-AIS and VPseg-AIS cells, the same VPI value as that of the affected VP is assigned to the VPseg-AIS cell. The VCI is used to distinguish VP connection level and connection segment level AIS cells. A Defect Type Indicator (DTI) is set to "0" for physical layer defect and "1" for an ATM layer defect. The structure and coding of the ATM OAM Fault Management Cell with the DTI is illustrated in FIG. 4.

Figure 5:
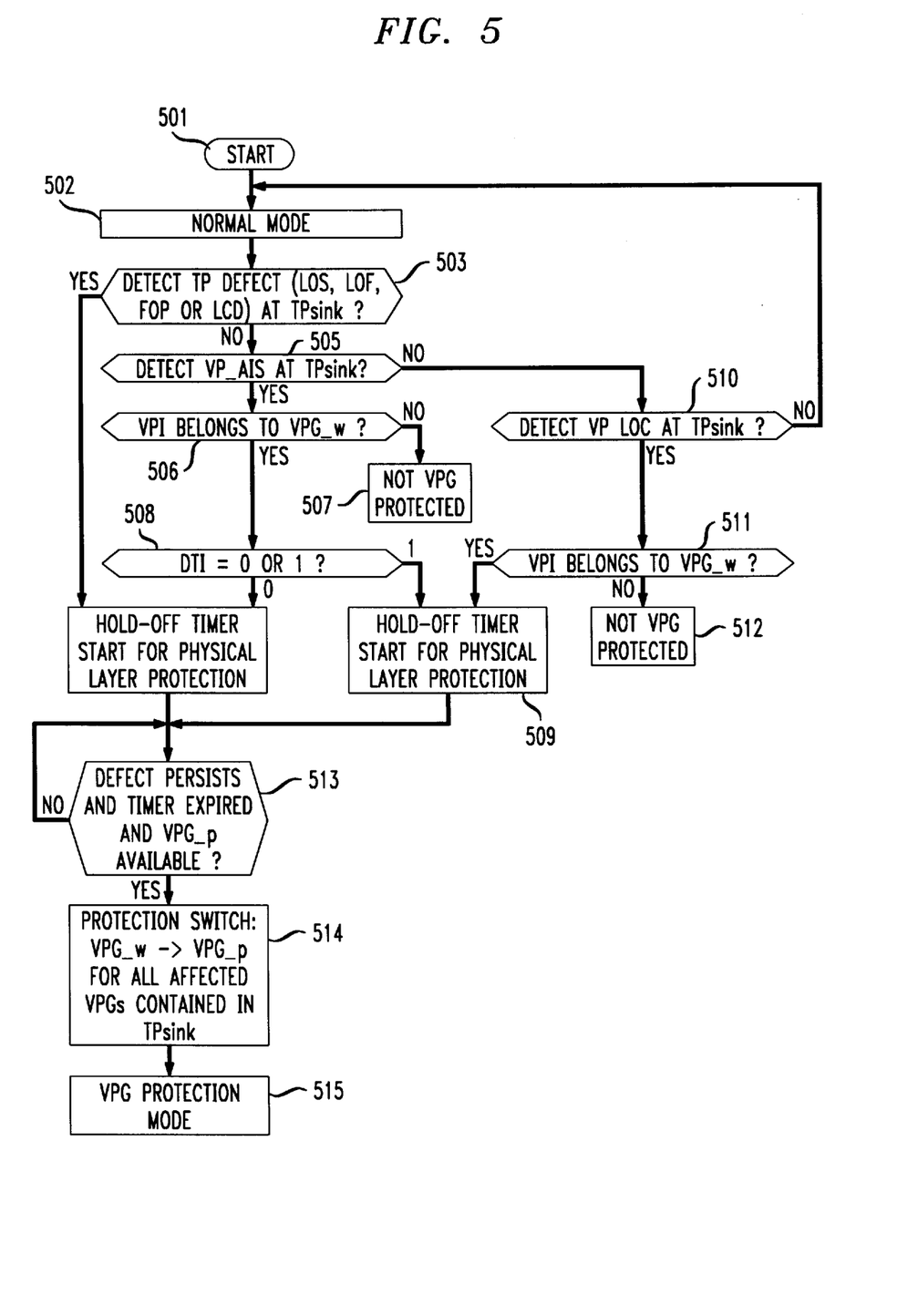
FIG. 5 shows a flowchart illustrating a Virtual Path Group (VPG) protection switching algorithm employed in a sink node which illustrates an embodiment of the invention.

FIG. 5 is a flow chart illustrating the VPG protection switching algorithm employed in an embodiment of the invention. The VPG protection switching algorithm may be applied to both the VP connection and connection segment levels. The VPG protection switching algorithm can be applied to both 1+1 and M:N protection switching architectures. The detection and notification mechanisms are exactly the same for both architectures. A sink TP node will perform protection switching in the 1+1 protection switching architecture. On the other hand, a source TP node will perform protection switching in the M:N protection switching architecture, where the sink TP node sends a switch request message to the source TP node when it receives a notification of a failure. The algorithm differentiates the 1+1 and M:N protection switching by "Switch/Switch Request". The VPG protection switching sink TP algorithm is given below and the corresponding flow chart is illustrated in FIG. 5.

initiates a holdoff timer for the ATM layer protection. Returning to step 505, if the test result is no, control is transferred to step 510 which detects the VP LOC at the TP sink node. If the test result is no in step 510, control is returned to step 502 and the process is iterated. If the test result in test 510 is yes, control is transferred to step 511 which tests whether the VPI belongs to VPG_w. If the test result in step 511 is no, control is transferred to step 512 which indicates that the VPG is not protected. If the test result in step 511 is yes, control is transferred to step 509. Upon either of holdoff timers in step 504 and 509 timing out, control is transferred to step 513 which detects if the defect persists and holdoff timer expired, and VPG_P is available. If the test result in step 513 is no, step 513 continues to test as indicated above until a yes result is obtained. Upon a yes result in step 513, control is transferred to step 514 which effects a protection switch for all affected VPGs contained in the TP sink node. Thereafter, control is transferred to step 515 which indicates that the network is in the protection switching mode.

```
If a sink TP node detects (LOS || LOF || LOP || LCD) { /* incoming physical
layer fail */
    For all VPGs contained in the TP node {
        If (VPGs_p is available)&& (holdoff time has expired) {
            Switch/Switch Request VPG_w to VPG_p
        }
    }
}
If a destination TP node receives VP-AIS for a VPI{
    If VPI belongs to a VPG_w {
        If DTI == 0{/* physical(server) layer defect */
            If (VPG_w is not switched to VPG_p) && (holdoff
                time has expired) && (VPG_p is available) {
                Switch/Switch Request VPG_w to VPG_p
            }
        }
        else if DTI == 1 { /* ATM(client) layer defect */
            If (VPG_w is not switched to VPG_p) && (holdoff
                time has expired) && (VPG_p is available){
                Switch/Switch Request VPG_w to VPG_p
            }
        }
    }
    else if a sink TP node detects Loss of Continuity for a VPI{/* ATM(client) layer
    failure*/
        If VPI belongs to a VPG_w{
            If (VPG_w is not switched to VG_p) && (holdoff
                time has expired) && (VPG_p is available){
                Switch/Switch Request VPG_w to VPG_p
            }
        }
    }
}
```

The protection switching algorithm is begun in start step 501. Thereafter, control is transferred to the normal mode of operation step 502, as described above. Thereafter, control is transferred to detect TP defect at the TP sink node in step 503. If the test result in step 503 is yes, control is transferred to step 504 which initiates the holdoff timer start for physical layer protection. If the test result in step 503 is no, control is transferred to step 505 which tests the VP_ASI at the TP sink node. If the test result in step 505 is yes, control is transferred to step 506 which tests to determine if the VPI belongs to VPG_w. If the test result in step 506 is no, the test is essentially ended because step 507 indicates that the VPG is not protected. If the test result in step 506 is yes, control is transferred to step 508 which tests to determine if the DTI is 0 or 1. If the test result in step 507 indicates 0, control is transferred to step 504. If the test result in step 508 is indicates 1, control is transferred to step 509 which The VPG protection switching architectures and VPG network element functionality is described, for simplicity, for ATM Virtual Path connection segments. The VPG protection switching architectures and network element functionality is easily extensible to ATM Virtual Path connections.

VPG Network Element Functional Architecture For Source Node 101, Intermediate Nodes 102 and 104 and Sink Node 103

The functional architecture for VPG Source, Intermediate, and Sink nodes 101, 102, 104 and 103, respectively, is illustrated, in a simplified block diagram, in FIG. 6. The VPG node includes:
  ingress Line Termination (LT) (601);
  egress LT (602);
  ingress Switch Fabric Interface (SFI) (603);
  egress SFI (604);

Switch Fabric (605);

ATM node Controller (606);

Element Manager (607) with external interface (EM1 (608). It should be noted that the element manager may or may not be included in the node per se.

Figure 7:
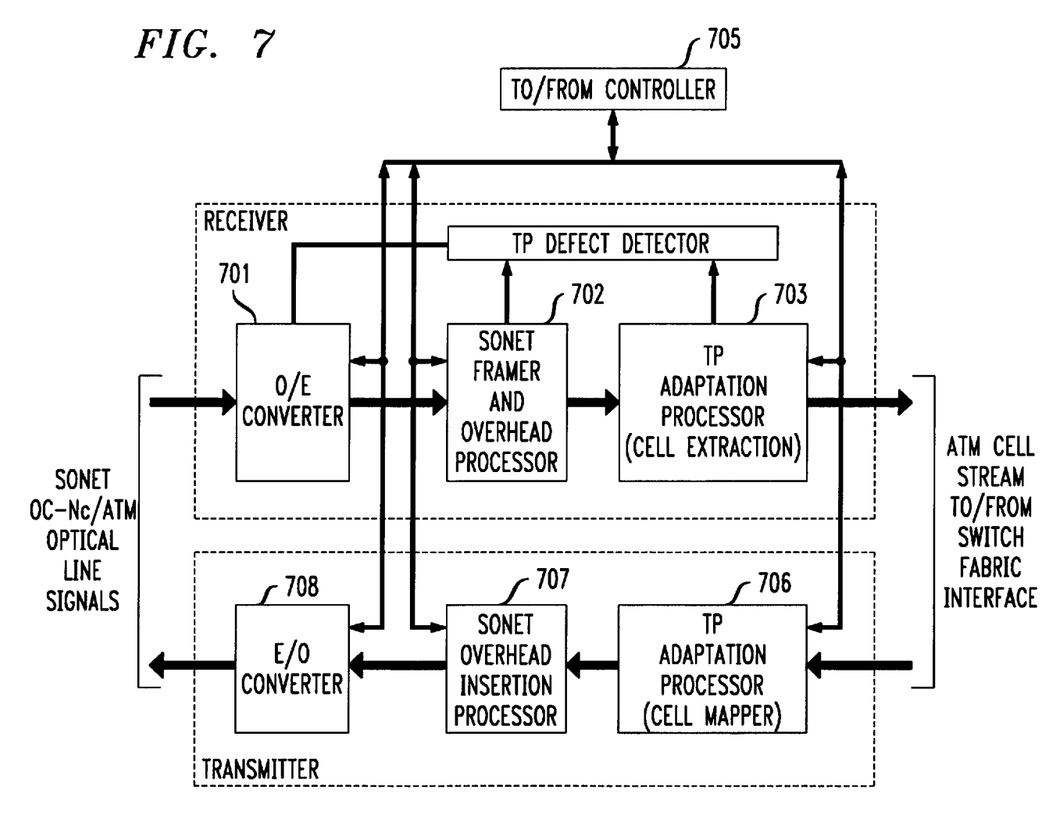
FIG. 7 shows, in simplified block diagram form, details of the line termination unit shown in FIG. 6.

The Line Termination functions are illustrated, in simplified block diagram, in FIG. 7. The LT functions are common to any VPG Source, Intermediate, or Sink nodes. The LT provides line termination functionality and physical layer defect detection. On the LT receiver side, the O/E Converter (701) provides optical-to-electrical conversion of received SONET optical signals (e.g. OC-3) carrying ATM. (This step in not necessary for received electrical signals (e.g. DS3) carrying ATM). The electrical signal is transmitted to a SONET Framer and Section/Line Overhead Processor (702). The SONET Path Overhead and payload of the SONET frame, which carries the ATM cell stream, is transmitted to the Transmission Path (TP) Adaptation Processor (703). At this processor, the ATM cell stream is extracted from the SONET frame and the cell stream is delineated into ATM cells. A Defect Detector (704) is necessary to detect Physical Layer defects. For example, Loss of Signal (LOS) is detected at the O/E Converter (701), Loss of Frame (LOF) is detected at the SONET Framer (702), and Loss of Cell Delineation (LCD) is detected at the TP Adaptation Processor (703). Detection criteria for these defects are according to specified standards. Indications of detected defects are sent to the node Controller (705). The node Controller also provides any required input to/output from the processors in the LT.

On the transmitter side of the LT, the reverse set of functions are performed. At the TP Adaptation Processor (706), a received delineated ATM cell stream from the Fabric Interface is mapped to a SONET payload with SONET Path Overhead added. This SONET Path/Payload stream is then framed with SONET Line and Section Overhead added at the SONET Overhead Insertion Processor (707). This electrical signal is then converted to an optical one at the E/O Converter (708) on output from the node. All of the LT external signal formats and required overhead processing is according to standards.

Figure 8:
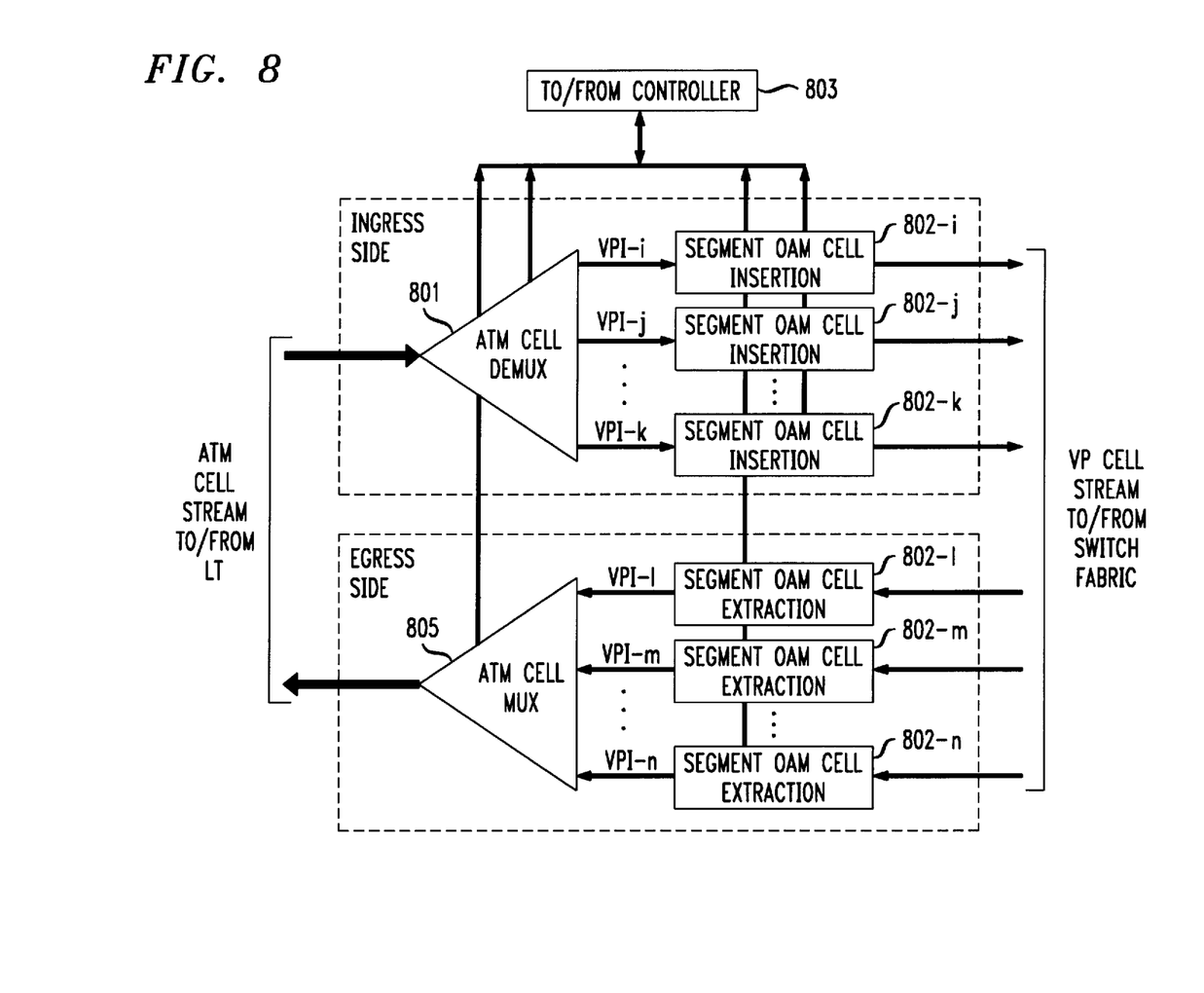
FIG. 8 shows, in simplified block diagram form, the switch fabric interface employed in a source ATM node.

The Switch Fabric Interface functions at a VPG Source node are illustrated, in simplified block diagram, in FIG. 8. The SFI provides ATM VP cell header processing and de/multiplexing, VP OAM cell processing, and cell addressing for input and routing to the Switch Fabric. On the ingress side of the SFI, ATM VP cell header processing and demultiplexing is performed at the ATM Cell Demux (801) according to standards. The demultiplexed VP connections, based on VPI, are transmitted to Segment OAM Cell Insertion Processors (802-i–802-k). This processor is the generation point of OAM cells for activated VPIs. VP-AIS cells are inserted for each affected VP in the case where a TP defect is detected at the receiver LT. The LT defect indication to the SFI is handled by the SFI Controller interface (803).

The Controller may also initiate other Segment OAM cell insertions at (802s) for selected VPIs. These insertions are related to provisioned functions for the VP connection segment, such as Continuity Check and Segment Performance Monitoring. These functions are needed to detect respectively Loss of Continuity and VP Segment Degrade defects, which may be used to initiate VPG protection switching. The generation of Continuity Check and Performance Monitoring OAM cells is according to 1.610 standards.

On the egress side of the SFI, VP segment OAM cells are extracted at the Extraction Processors (804-l–804-n). In a VPG 1:1 protection switching architecture, specific OAM cells requesting switch would be processed at (804s). The activated VPI streams are multiplexed at (805) for input to the LT transmitter.

Figure 9:
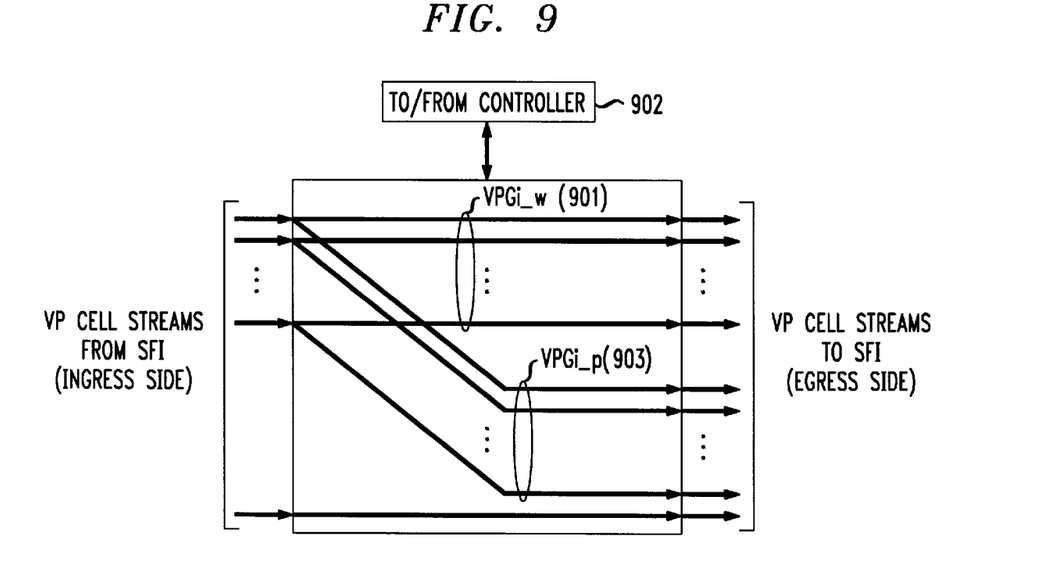
FIG. 9 illustrates the logical configuration of the switch fabric in a source ATM node.

The Switch Fabric (SF) logical configuration is illustrated, in simplified form, in FIG. 9. At the SF, the individual VPIs are checked for a working VPG (901) association. This check is provided by memory table lookups, or via exchange information from the Controller (902). In the case that there is a working VPG for a given VPI, the ATM cells associated with this VPI are copied (903) onto the assigned VPI associated with the protection VPG. The working and protection VPI/VPG assignments were made initially by the sub-network management system. The ATM SF architecture is independent of the VPG protection switching method and no particular architecture (e.g. Shared Memory Fabric, Banyan, etc.) is required or implied. Only the mechanism to provide 1:2 cell copying is required.

Figure 10:
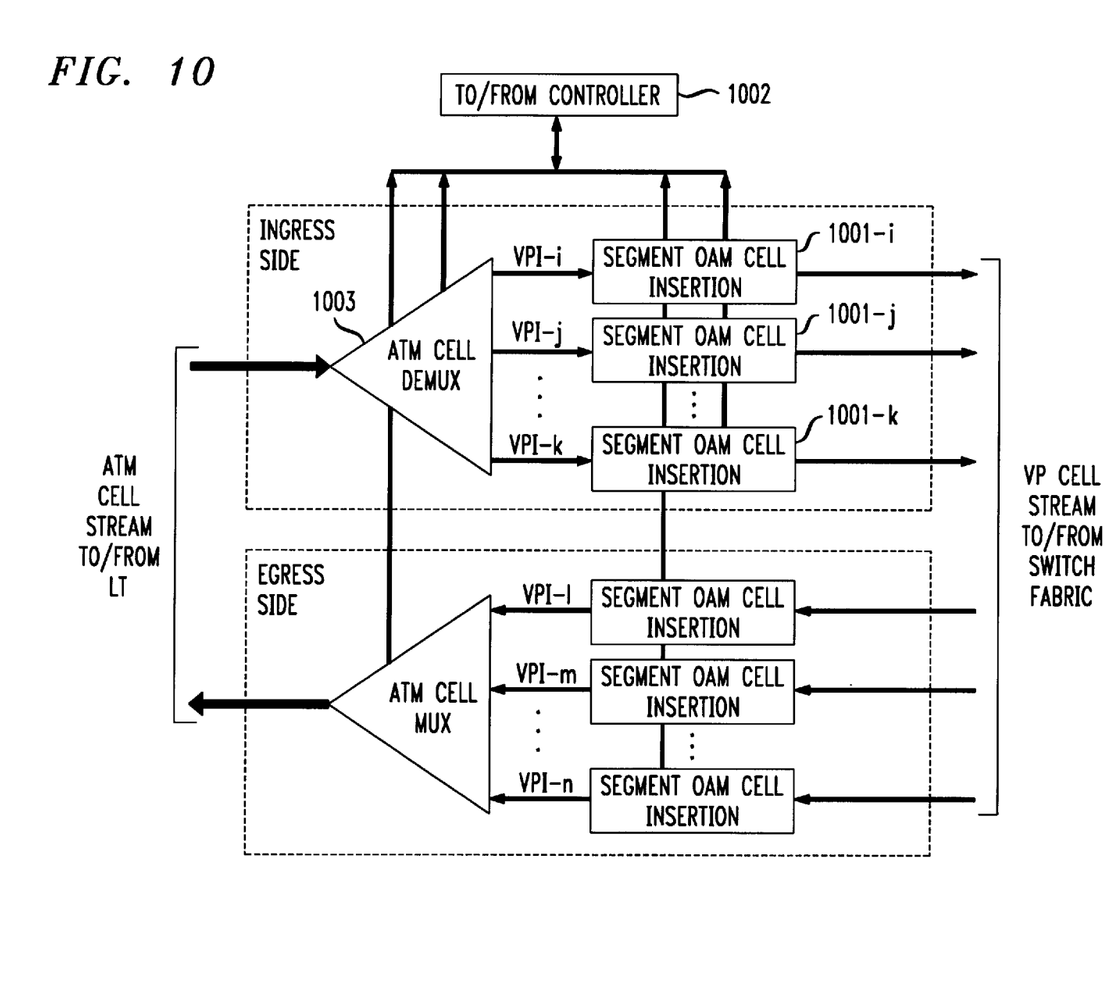
FIG. 10 shows, in simplified block diagram form, the switch fabric interface at an intermediate ATM node.

The SFI functions at a VPG Intermediate node are illustrated, in simplified block diagram, in FIG. 10. The functions of this SFI are similar to the functions at the SFI at the Source node. Only VP segment OAM cell insertion (1001-i–1001-k) is needed to indicate the detection of a Physical Layer defect at the LT. Note that the ingress side of the intermediate node is essentially identical to the egress side of the intermediate node which will not be described in detail. The VP segment OAM cell insertion (with DTI=0) applies to all active VPIs affected by the Physical Layer defect. One VP segment AIS cell is inserted for each affected VPI and continues repeatedly until the initiating defect indication is cleared by the controller/element manager (1002) or the VP connection segment is released by the sub-network management system. The VP de/multiplexing functions and ATM cell header processing functions (1003) are the same as in the SFI Source node. At the VPG Intermediate node, the Switch Fabric logical configuration does not require any knowledge of the VPI/VPG association. The SF only requires proper VPI translation for the working and protection VPIs. The VPI translation is managed via the controller by the element manager.

Figure 11:
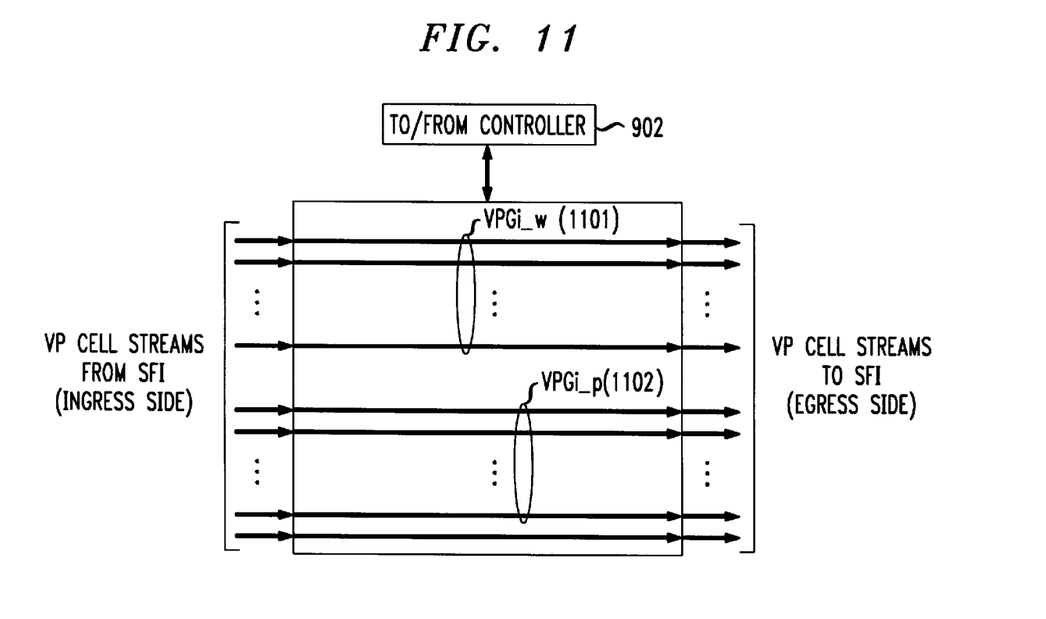
FIG. 11 illustrates the logical configuration of the switch fabric in a sink ATM node.

At the VPG Sink node, it is necessary for the Switch Fabric to have knowledge of the VPI/VPG logical association for proper routing to the egress SFI at the VPG Sink node. The SF logical configuration of the VPG Sink node is illustrated FIG. 11. The working VPG (1101) and the protection VPG (1102) are routed to the same egress SFI. As described previously, the VPI/VPG association is managed by the Controller/Element Manager (1103).

Figure 12:
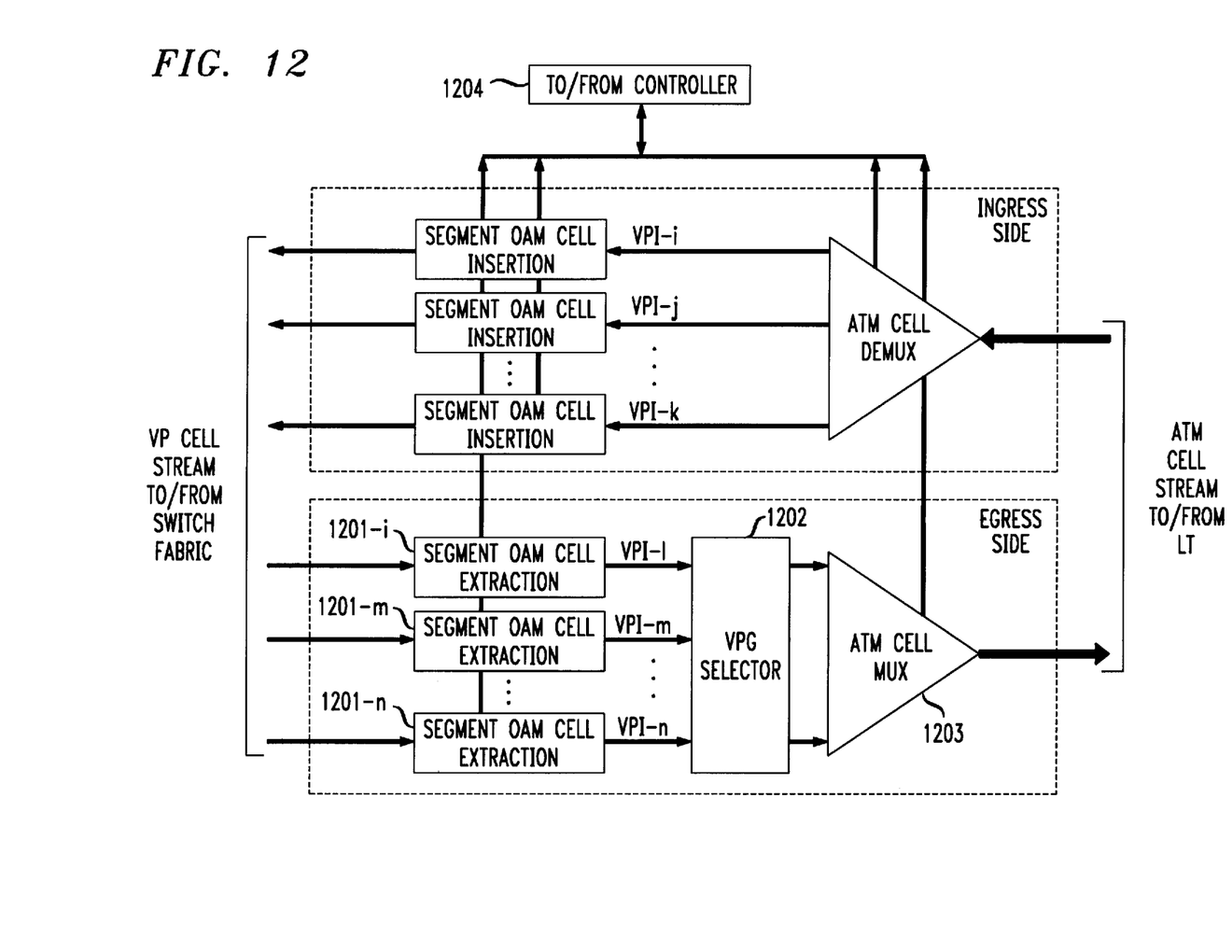
FIG. 12 shows, in simplified block diagram form, the switch fabric interface of a sink ATM node.

The SFI functions at the VPG Sink node are illustrated, in simplified block diagram, in FIG. 12. Again, it is noted that the ingress side of the sink node shown in FIG. 12 is essentially identical to the ingress side of the source node shown in FIG. 8 and therefore will not be described again in detail. VP segment OAM cells are extracted and processed at extraction units (1201-l–1201-n) for all activated VPI cell flows out of the SF. At extraction units (1201) is where VPseg-AIS, VP segment LOC, and VP segment signal degrade defects are detected. The DTI for the VPseg-AIS is also decoded at (1201s). Based on this information, either Physical Layer or ATM Layer protection switching delay timers are initiated at the VPG Selector (1202). Once the VPG timer has expired and along with other related conditions being satisfied, the VPG Selector (1202) changes from the working VPG VPIs to the protection VPG VPIs for routing to the ATM VP Cell Mux (1203). The VPG protection switching algorithm illustrated above in FIG. 5 is implemented in (1201s) and (1202). The VP segments are protected on a group basis, thus reduced processing is required at the SFI egress side of the VPG Sink node. The VPI/VPG association is managed via the Controller/Element Manager (1204).

Problems and limitations of prior protection switching arrangements for ATM networks are overcome by using a Virtual Path Group protection switching technique that employs network elements that are visible to Physical Layer and ATM Layer defects, and allows for large numbers of ATM Virtual Path Connections to be protection switched/restored on the order of 50 milliseconds with minimized node processing.

What is claimed is:

1. A node for use in an asynchronous transfer mode (ATM) protection switching transmission system comprising:

means for defining virtual path groups (VPGs) within a virtual path identifier (VPI) address that indicates a destination node virtual path switching function;

means for mapping said VPGs to prescribed managed ATM transmission paths, the node being arranged to receive at least one working VPG (VPG_w) from at least one working ATM transmission path and at least one corresponding protection VPG (VPG_p) from at least one protection ATM transmission path;

means for defining each of said VPGs including a plurality of virtual paths having a corresponding plurality of VPI addresses with a common destination node virtual path switching function;

means for defining a VPI address, VPG association so that the VPI address definition is not changed;

means for detecting a defect in the at least one VPG_w; and means for VPG protection switching from receiving the at least one VPG_w having the defect and the VPI address being associated therewith from said at least one working ATM transmission path to receiving a corresponding VPG_p from said at least one protection ATM transmission path.

2. The invention as defined in claim 1 further including means for generating an ATM cell having a defect type indicator (DTI) field and means for inserting a defect type code into said DTI field indicating a prescribed defect.

3. The invention as defined claim 2 wherein said defect type code is indicative of a physical layer defect.

4. The invention as defined in claim 2 wherein said defect code is indicative of an ATM layer defect.

5. The invention as defined in claim 1 wherein said at least one VPG comprises at least one virtual path (VP) connection.

6. The invention as defined in claim 5 wherein said means for detecting a defect includes means for indicating whether a virtual path alarm indicator signal (VP_AIS) has been detected, means responsive to an indication that no VP_AIS has been detected for determining whether there is an ATM layer defect further including means responsive to an indication that an ATM layer defect has been detected for determining whether the VPI is associated with the affected at least one working VPG said means for protection switching making a protection switch from the VPG_w having the defect and the VPI address being associated therewith to the corresponding VPG_p, if available.

7. The invention as defined in claim 6 further including first timer means supplied with an indication that the VPI is associated with the at least one VPG_w for delaying said means for protection switching making said protection switch for a first predetermined interval.

8. The invention as defined in claim 5 wherein said means for detecting a defect includes means for indicating whether a virtual path alarm indicator signal (VP_AIS) has been detected, further including means responsive to an indication that the VP_AIS has been detected for determining whether the VPI is associated with the affected at least one VPG_w, said means for protection switching making a protection switch from the VPG_w having the defect and the VPI address being associated therewith to the corresponding VPG_p, if available.

9. The invention as defined in claim 8 further including means for detecting reception of a defect type indicator (DTI), said DTI indicates whether the detected defect is a physical layer defect or an ATM layer defect, first timer means supplied with an indication that the defect associated with the at least one VPG_w is an ATM layer defect for delaying said means for protection switching making said protection switch for a first predetermined interval and second timer means supplied with an indication that the defect associated with the at least one VPG_w is a physical layer defect for delaying said means for protection switching making said protection switch for a second predetermined interval.

10. The invention as defined in claim 1 wherein said at least one VPG comprises at least one virtual path (VP) connection segment.

11. The invention as defined in claim 10 wherein said means for detecting a defect includes means for indicating whether a virtual path connection segment alarm indicator signal (VPseg_AIS) has been detected means responsive to an indication that no VPseg_AIS has been detected for determining whether there is an ATM layer defect, further including means responsive to an indication that an ATM layer defect has been detected for determining whether the VPI is associated with the affected at least one VPG_w, said means for protection switching making a protection switch from the VPG_w having the defect and the VPI address being associated therewith to the corresponding VPG_p, if available.

12. The invention as defined in claim 11 further including first timer means supplied with an indication that the VPI is associated with the at least one VPG_w for delaying said means for protection switching making said protection switch for a first predetermined interval.

13. The invention as defined in claim 10 wherein said means for detecting a defect includes means for indicating whether a virtual path connection segment alarm indicator signal (VPseg_AIS) has been detected, further including means responsive to an indication that the VPseg_AIS has been detected for determining whether the VPI is associated with the affected at least one VPG_w, said means for protection switching making a protection switch from the VPG_w having the defect and the VPI address being associated therewith to the corresponding VPG_p, if available.

14. The invention as defined in claim 13 further including means for detecting reception of a defect type indicator (DTI), said DTI indicates whether the detected defect is a physical layer defect or an ATM layer defect, first timer means supplied with an indication that the defect associated with the at least one VPG_w is an ATM layer defect for delaying said means for protection switching making said protection switch for a first predetermined interval and second timer means supplied with an indication that the defect associated with the at least one VPG_w is a physical layer defect for delaying said means for protection switching making said protection switch for a second predetermined interval.

15. A node having a prescribed architecture for use in an asynchronous transfer mode (ATM) protection switching transmission system comprising:
  means for defining virtual path groups (VPGs) within a virtual path identifier (VPI) address that indicates a destination node virtual path switching function;
  means for mapping said VPGs to prescribed managed ATM transmission paths, the node being arranged to receive at least one working VPG (VPG_w) from at least one working ATM transmission path and at least one corresponding protection VPG (VPG_p) from at least one protection ATM transmission path;
  means for detecting a defect in the at least one working VPG;
  means for generating an ATM cell having a defect type indicator (DTI) field;
  means for inserting a defect type code into said DTI field indicating a prescribed detected type of defect; and
  means for transmitting said ATM cell including the DTI to a next downstream node.

16. The invention as defined claim 15 wherein said defect type code is indicative of a physical layer defect.

17. The invention as defined in claim 15 wherein said defect code is indicative of an ATM layer defect.

18. A method of protection switching for use in a node having a prescribed architecture for use in an asynchronous transfer mode (ATM) transmission system, the node being arranged to receive at least one working virtual path group (VPG_w) from at least one working ATM transmission path and at least one protection virtual path group (VPG_p) from at least one protection ATM transmission path, the method comprising the steps of:
  defining virtual path groups (VPGs) within a virtual path identifier (VPI) address that indicates a destination node virtual path switching function;
  mapping said VPGs to prescribed managed ATM transmission paths;
  defining each of said VPGs including a plurality of virtual paths having a corresponding plurality of VPI addresses with a common destination node virtual path switching function;
  defining a VPI address, VPG association so that the VPI address definition is not changed;
  detecting a defect in the at least one working VPG; and
  VPG_protection switching from receiving the at least one working VPG (VPG_w) having the defect and the VPI address associated therewith from said at least one working ATM transmission path to receiving a corresponding protection VPG (VPG_p) from said at least one protection ATM transmission path.

19. The method as defined in claim 18 further including generating an ATM cell having a defect type indicator (DTI) field and inserting a defect type code into said DTI field indicating a prescribed defect.

20. The method as defined claim 19 wherein said defect type code is indicative of a physical layer defect.

21. The invention as defined in claim 19 wherein said defect code is indicative of an ATM layer defect.

22. The method as defined in claim 18 wherein said at least one VPG comprises at least one virtual path (VP) connection.

23. The method as defined in claim 18 wherein said step of detecting a defect includes the steps of indicating whether a virtual path alarm indicator signal (VP_AIS) has been detected, in response to an indication that no VP_AIS has been detected determining whether there is an ATM layer defect, further including in response to an indication that an ATM layer defect has been detected determining whether the VPI is associated with the affected at least one working VPG, said step of protection switching making a protection switch from the VPG_w having the defect and the VPI address being associated therewith to the corresponding VPG_p, if available.

24. The method as defined in claim 22 further including in response to an indication that the VPI is associated with the at least one VPG_w delaying said protection switching for a first predetermined interval.

25. The method as defined in claim 18 wherein said step of detecting a defect includes indicating whether a virtual path alarm indicator signal (VP_AIS) has been detected, further including in response to an indication that the VP_AIS has been detected determining whether the VPI is associated with the affected at least one VPG_w, said step of protection switching effecting a protection switch from the VPG_w having the defect and the VPI address being associated therewith to the corresponding VPG_p, if available.

26. The method as defined in claim 25 further including the steps of detecting reception of a defect type indicator (PTI), said DTI indicates whether the detected defect is a physical layer defect or an ATM layer defect, in response to an indication that the defect associated with the at least one VPG_w is an ATM layer defect delaying said protection switching for a first predetermined interval and in response to an indication that the defect associated with the at least one VPG_w is a physical layer defect delaying said protection switching for a second predetermined interval.

27. The method as defined in claim 18 wherein said at least one VPG comprises at one virtual path (VP) connection segment.

28. The method as defined in claim 27 wherein said step of detecting a defect includes indicating whether a virtual path connection segment alarm indicator signal (VPseg_AIS) has been detected, in response to an indication that no VPseg_AIS has been detected determining whether there is an ATM layer defect, further including in response to an indication that an ATM layer defect has been detected determining whether the VPI is associated with the affected at least one working VPG, said step of protection switching making a protection switch from the VPG_w having the defect and the VPI address being associated therewith to the corresponding VPG_p, if available.

29. The method as defined in claim 28 further including in response to an indication that the VPI is associated with the at least one VPG_w delaying said protection switching making for a first predetermined interval.

30. The method as defined in claim 27 wherein said step of detecting a defect includes indicating whether a virtual path connection segment alarm indicator signal (VPseg_AIS) has been detected, further including in response to an indication that the VPseg_AIS has been detected determining whether the VPI is associated with the affected at least one VPG_w, said step of protection switching making a protection switch from the VPG_w having the defect and the VPI address being associated therewith to the corresponding VPG_p, if available.

31. The method as defined in claim 30 further including a step of detecting reception of a defect type indicator (DTI), said DTI indicates whether the detected defect is a physical layer defect or an ATM layer defect, in response to an indication that the defect associated with the at least one VPG_w is an ATM layer defect delaying making said protection switching for a first predetermined interval and in response to an indication that the defect associated with the at least one VPG_w is a physical layer defect delaying making said protection switch for a second predetermined interval.

32. A protection switching system for use in an asynchronous transfer mode (ATM) transmission system comprising:

a plurality of nodes connected in said ATM transmission system, each of said nodes including, means for defining virtual path groups (VPGs) within a virtual path identifier (VPI) address that indicates a destination node virtual path switching function;

means for mapping said VPGs to prescribed managed ATM transmission paths, the node being arranged to receive at least one working VPG (VPG_w) from at least one working ATM transmission path and at least one corresponding protection VPG (VPG_p) from at least one protection ATM transmission path;

means for defining each of said VPGs including a plurality of virtual paths having a corresponding plurality of VPI addresses with a common destination node virtual path switching function;

means for defining a VPI address, VPG association so that the VPI address definition is not changed;

means for detecting a defect in the at least one VPG_w; and means for VPG_protection switching from receiving the at least one VPG_w having the defect and the VPI address being associated therewith from said at least one working ATM transmission path to receiving an corresponding VPG_p from said at least one protection ATM transmission path.

33. The invention as defined in claim 32 further including means for generating an ATM cell having a defect type indicator (DTI) field and means for inserting a defect type code into said DTI field indicating a prescribed defect.

34. The invention as defined claim 33 wherein said defect type code is indicative of a physical layer defect.

35. The invention as defined in claim 33 wherein said defect code is indicative of an ATM layer defect.

36. The invention as defined in claim 32 wherein said means for detecting a defect includes means for indicating whether a virtual path alarm indicator signal (VP_AIS) has been detected, means responsive to an indication that no VP_AIS has been detected for determining whether there is an ATM layer defect, further including means responsive to an indication that an ATM layer defect has been detected for determining whether the VPI is associated with the affected at least one working VPG, said means for protection switching making a switch from the VPG_w having the defect and the VPI address being associated therewith to the corresponding VPG_p, if available.

37. The invention as defined in claim 32 wherein said means for detecting a defect includes means for indicating whether a virtual path alarm indicator signal (VP_AIS) has been detected, further including means responsive to an indication that the VP_AIS has been detected for determining whether the VPI is associated with the affected at least one VPG_w, said means for protection switching making a protection switch from the VPG_w having the defect and the VPI address being associated therewith to the corresponding VPG_p, if available.

* * * * *